United States Patent [19]

Bauch

[11] 4,392,524
[45] Jul. 12, 1983

[54] APPARATUS FOR REMOVING A TUBE CORE FROM AND INSERTING SAME INTO A HEAT EXCHANGER

[76] Inventor: Ludwig Bauch, Kirchweg 7, 8079 Egweil, Fed. Rep. of Germany

[21] Appl. No.: 329,061

[22] Filed: Dec. 9, 1981

[30] Foreign Application Priority Data

Dec. 10, 1980 [DE] Fed. Rep. of Germany ....... 3046467

[51] Int. Cl.³ ............................................. F28F 9/00
[52] U.S. Cl. .................................. 165/76; 165/11 R; 248/68 R; 248/125; 248/647
[58] Field of Search ............... 165/76, DIG. 26, 11 R, 165/11 A; 248/68 R, 125, 647

[56] References Cited

U.S. PATENT DOCUMENTS 2,730,320 1/1956 Srader .................................. 248/647

OTHER PUBLICATIONS

Dutch document "Pijpenbundeltrekker" of Peinemann RV Rotterdam, Netherlands.

Primary Examiner—Sheldon J. Richter
Assistant Examiner—John F. McNally
Attorney, Agent, or Firm—Karl F. Ross; Herbert Dubno

[57] ABSTRACT

The apparatus is used in combination with a heat exchanger having a horizontally elongated and longitudinally removable tube bundle. The apparatus comprises an elongated vehicular base provided with wheels and capable of rolling on the ground in a predetermined direction longitudinal of the base. An upright vertically telescoping column is supported on the base and defines an upright axis. An elongated support to one side of the upper end of the column and defines a horizontal axis and the support can rotate about the upright axis, so that the horizontal axis can be parallel or transverse to the elongated base. A carriage is displaceable axially along the support and adapted to engage the end of the bundle. The carriage can be displaced axially along the support when engaged with the bundle to displace the bundle along the support. The single apparatus is able to extract the tube bundle unassisted, transport it to and from the cleaning location, and reinsert it into the heat exchanger.

14 Claims, 4 Drawing Figures

APPARATUS FOR REMOVING A TUBE CORE FROM AND INSERTING SAME INTO A HEAT EXCHANGER

FIELD OF THE INVENTION

The present invention relates to an apparatus for removing a tube core from and inserting same back into a heat exchanger.

BACKGROUND OF THE INVENTION

A standard heat exchanger has an outer hollow housing provided internally with a core formed of a bundle of tubes. One fluid is circulated through the tubes and another in the housing around the tubes for heat exchange through the tube walls between these fluids. The fluids eventually coat the tubes with various deposits which not only impair the heat exchange through the tube walls, but which also can even reduce the flow cross section through the heat exchanger. Thus it is necessary periodically to remove the core and clean it.

This operation, as described in the Dutch document "Pijpenbundeltrekker" of Peinemann RV of Rotterdam, Netherlands, is typically carried out by an apparatus having an elongated support on which is provided a longitudinally extensible hydraulic cylinder. This support in turn is longitudinally displaceable on a frame and can be secured at any longitudinally offset position along this frame. The end of the piston rod carries a clip which fits with the flange normally provided at one end of the tube bundle.

Normally this apparatus, complete with its motors and drives, is hung via a portal-like structure from a crane so that it can be positioned level with the heat exchanger whose core is to be pulled or inserted. The apparatus, which is provided with substantially more complex and bulky structure not described above, is positioned by the crane and connected to the exchanger housing and core.

When a core is withdrawn, it is then displaced to the cleaning location by the crane. For this operation the entire elongated assembly must be carried transverse to the direction of displacement in order that the crane can get close enough to it to support it without tipping over. Hence a wide path must exist between the heat exchanger and the location where the core is cleaned.

It has been suggested to provide a special truck to transport the removed core to the cleaning location. This does eliminate the need for providing a wide path, but necessitates the use of yet another piece of equipment.

OBJECTS OF THE INVENTION

It is therefore an object of the present invention to provide an improved apparatus for removing a tube core from and inserting same into a heat exchanger.

Another object is the provision of such an apparatus for removing a tube core from and inserting same into a heat exchanger which overcomes the above-given disadvantages.

A further object is to provide a single piece of equipment which can remove and insert the core bundle and transport it.

SUMMARY OF THE INVENTION

These objects are attained according to the instant invention in an apparatus used in combination with a heat exchanger having a horizontally elongated and longitudinally removable tube bundle. The apparatus according to this invention comprises an elongated vehicular base provided with wheels and capable of rolling on the ground in a predetermined direction longitudinal of the base. An upight vertically telescoping column is supported on the base and defines an upright axis. An elongated support to one side of the upper end of the column defines a horizontal axis about which appropriate means can rotate the support, so that the horizontal axis can be parallel or transverse to the elongated base. A carriage is displaceable axially along the support and adapted to engage the end of the bundle. Means is provided for displacing the carriage axially along the support when engaged with the bundle to displace the bundle along the support.

Thus the single apparatus according to the instant invention will be able to extract the tube bundle unassisted, transport it to and from the cleaning location, and reinsert it into the heat exchanger. A single operator can control the machine according to this invention. In addition the apparatus can itself gain access to virtually any heat exchanger due to the lateral position of the support and extractor/inserter carriage. This lateral offset for the support also allows the apparatus according to this invention to extract, insert, and transport a core longer than the support. The apparatus can position itself even in very cramped locations to work on a core bundle with, if necessary, the vehicle base perpendicular to the core being worked on.

According to another feature of the invention, the column has upper, lower, and intermediate vertically telescoping parts. The apparatus further comprises means for vertically relatively telescoping the parts. The support according to this invention is fixed on the upper part to one side thereof and can move into a lower position virtually resting on the vehicular base. Thus the apparatus can reach a relatively high heat exchanger, but still can sink down very low to transport the core. When the column is fully shortened the apparatus furthermore is relatively short, so that it can pass easily through even a crowded plant.

In accordance with another feature of the invention the means for rotating the support includes a turntable on the base carrying the lower part for rotation through 360° about the upright axis. Such construction allows the apparatus to handle relatively heavy cores, while at the same time permitting the angular position of the column to be adjusted relatively finely.

The means for displacing the carriage on the elongated support includes a hydraulic motor on the carriage having a pinion and at least one rack on the support meshing with the pinion. Thus the carriage can move the full length of the support, unlike the hydraulic-ram system of the prior-art devices which also are much heavier than the self-propelling carriage of the instant apparatus.

The apparatus according to this invention further is provided on the support with at least one vertically expansible prop displaceable axially along the support. Several such props can therefore support the tube bundle on the support at respective locations, thereby ensuring gentlest possible treatment of the core. The can be automatically positioned at any location along the core to support it as evenly as possible.

The support of this invention is axially slidable on the column and is provided with at least one hydraulic cylinder connected between the support and the column. Thus the cylinder can expand and contract to axially displace the support on the column. As a result of this feature the support can be exactly positioned on the heat exchanger once the vehicular base has approximately moved it into position.

In order that the entire assembly of the instant invention can be self-contained the vehicular base is provided with an engine and a pump driven thereby. All of the various subassemblies are hydraulically powered by this pump.

The support according to the invention has a front end provided with a clip engageable with the heat exchanger to fix the support relative to the heat exchanger. Thus the support is firmly secured to the heat exchanger so that its parts are only stressed in tension or compression as a core is inserted or extracted.

In order that the support of this invention is as rigid as possible, it includes a pair of axially extending and horizontally spaced I-beams having upper flanges on which the carriage is displaceable. The props ride on the lower flanges, so that the carriage and supports can move independently of one another.

The tube bundle has at one end a flange and the carriage is formed with a seat complementary to the flange. Thus the assembly of this invention does not have to be appreciably longer than the longest core it will deal with.

The vertically expansible props are each formed as a pair of crossing arms and are each provided with a rollers riding on the support and displaceable axially along the support. Further rollers engage the tube bundle being supported, so that even during raising and lowering of the props the tubes will be treated gently.

The support of the apparatus has a back end provided with lifting means. Thus the apparatus can be used also for removal of the heat-exchanger end cap. The lifting means can comprise a simple chain having a grab or shackle attachable to the heat-exchanger cover to yank it free and hold it as the core is extracted.

DESCRIPTION OF THE DRAWING

The above and other features and advantages will become more readily apparent from the following, reference being made to the accompanying drawing in which.

SPECIFIC DESCRIPTION

Figure 4:
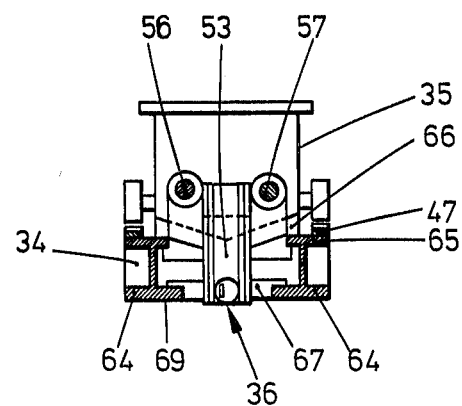
FIGS. 3 and 4 are sections taken respectively along lines III—III and IV—IV of FIG. 2.

As seen in the drawing the apparatus according to this invention is as intended to withdraw a tube bundle 21 from a cylindrical heat-exchanger housing 22. The bundle 21 has tubes 23, an end flange 24, and circumferential stiffening plates 24'.

To this end the apparatus has a vehicular base 20 comprising an elongated chassis 25 normally supported via four wheels 26 at least two of which are steerable and two of which are powered by respective hydraulic motors. Standard lifters 28 have feet 27 that can be lowered during operation of the apparatus to lift it off its wheels 26 so that it is perfectly steady. Centrally the chassis 25 is provided with a turntable 29 supporting a telescoping column having an inner lower part 31, an intermediate part 32, and an outer upper part 38 (FIG. 3). This part 38 carries a slide 33 on which a horizontally elongated support 34 is horizontally slidable to a limited extent by means of a cylinder 48 secured at 49 to the support 34 (FIG. 2) and at 68 to the slide 33.

Figure 1:
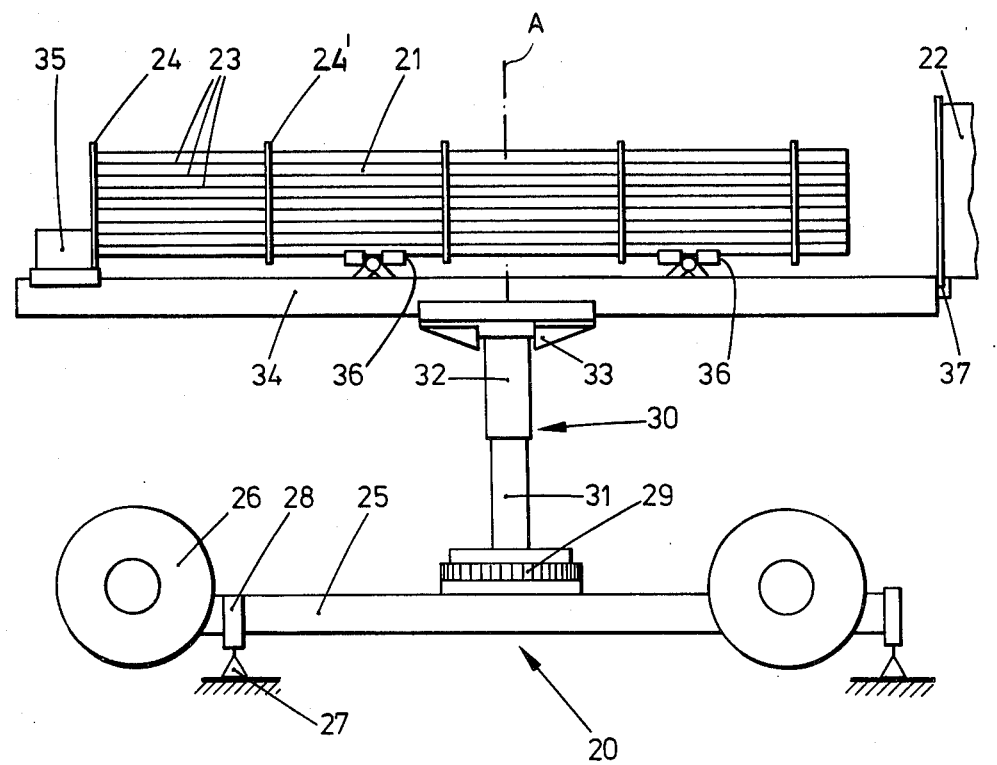
FIG. 1 is a side view of the apparatus of the instant invention.

A carriage 35 formed partially as a seat for the end flange 24 is displaceable the full length of the support 34. Similarly props or lifters 36 are also displaceable along this support 36 to hold up a tube bundle thereon as seen in FIG. 1. The support 34 is provided on its front end with a clip 37 by means of which it can be rigidly secured to the end of the heat-exchanger 22. On its rear end it has a hitch 58 connectable via a chain 59 or the like to a lifting tool or shackle 60 that can be connected to the removable end plate of the exchanger 22 to remove same and hold it while the core is being extracted, transported, and inserted.

The lower telescoping part 31 of the column 30 has a transverse plate 39 supported via struts 40 so that the column is extremely rigid. A drive motor 41 carried on the column 30 has a pinion 42 engaging in the outwardly directed teeth of the turntable 29 to rotate the column about its vertical axis A. FIG. 3 shows how the chassis 25 supports an engine or prime mover 62, which may be powered by electricity, propane, or any other suitable portable source of energy. This motor 62 is permanently connected to a pump 61 that powers all the various cylinders and motors described above and below, so that the entire apparatus of this invention is self-contained.

The telescoping column 30 is provided with a hydraulic cylinder 43 whose rod 44 is connected to the element 32. In turn the element 32 is provided with a support 70 for a telescoping hydraulic cylinder 44 connected at 63 to the upper part 38. Thus this column 30 can extend up quite a distance, but can still contract down to a relatively reduced height with the part 38 virtually resting on the chassis 25.

The carriage 35 is provided with a hydraulic motor 45 having outputs formed as pinions 46 meshing with racks 47 provided on the upper flanges 65 of I-beams 64 which form the support 34 and whose lower flanges 69 support crosspieces 67 of the props 36 as shown in FIG. 4. An upwardly broadly V-shaped slide 66 bridges the two I-beams 64 so that the core 21 can be moved along it.

Figure 2:
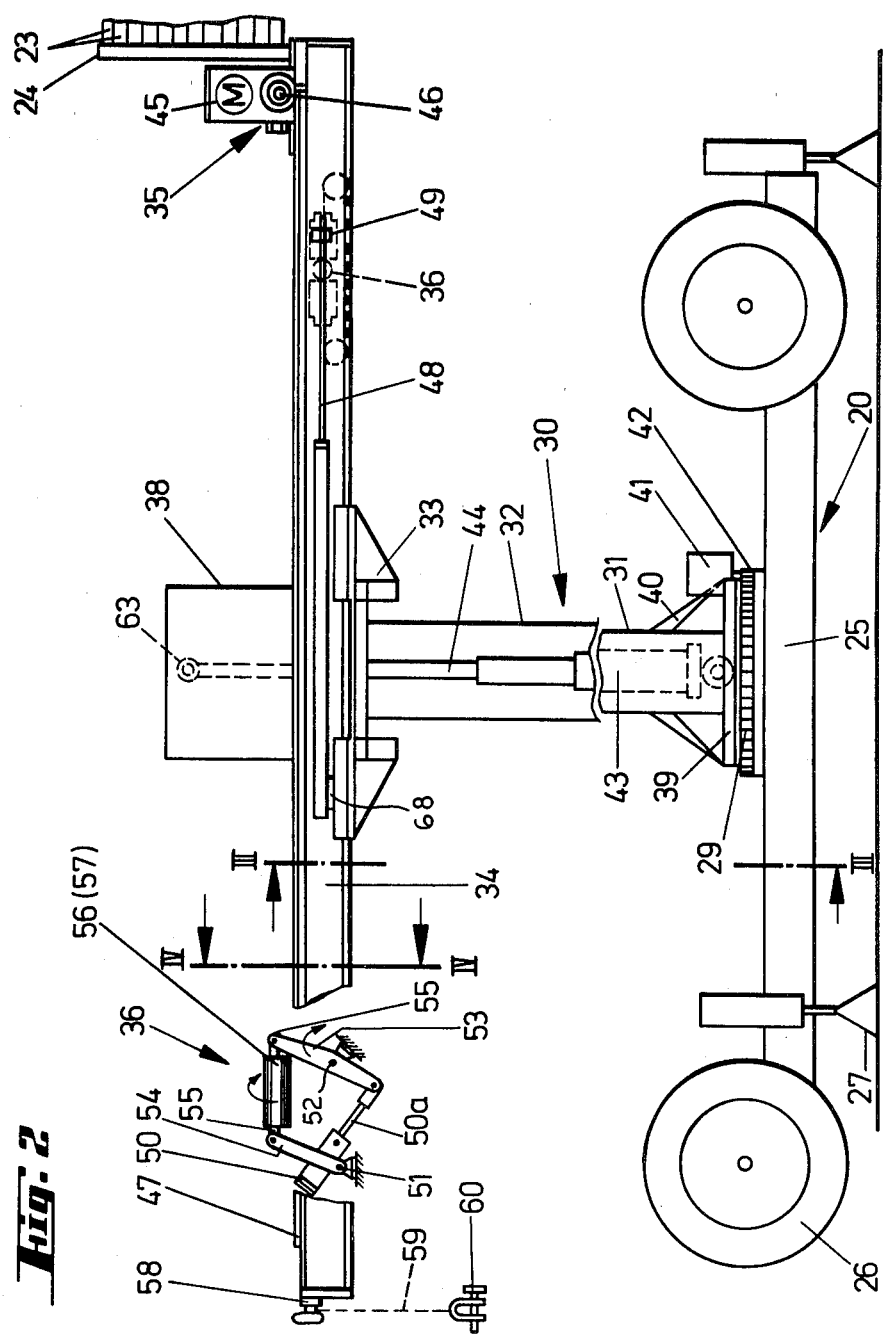
FIG. 2 is a partly broken away view of the apparatus of FIG. 1 in another operative position.
Figure 3:
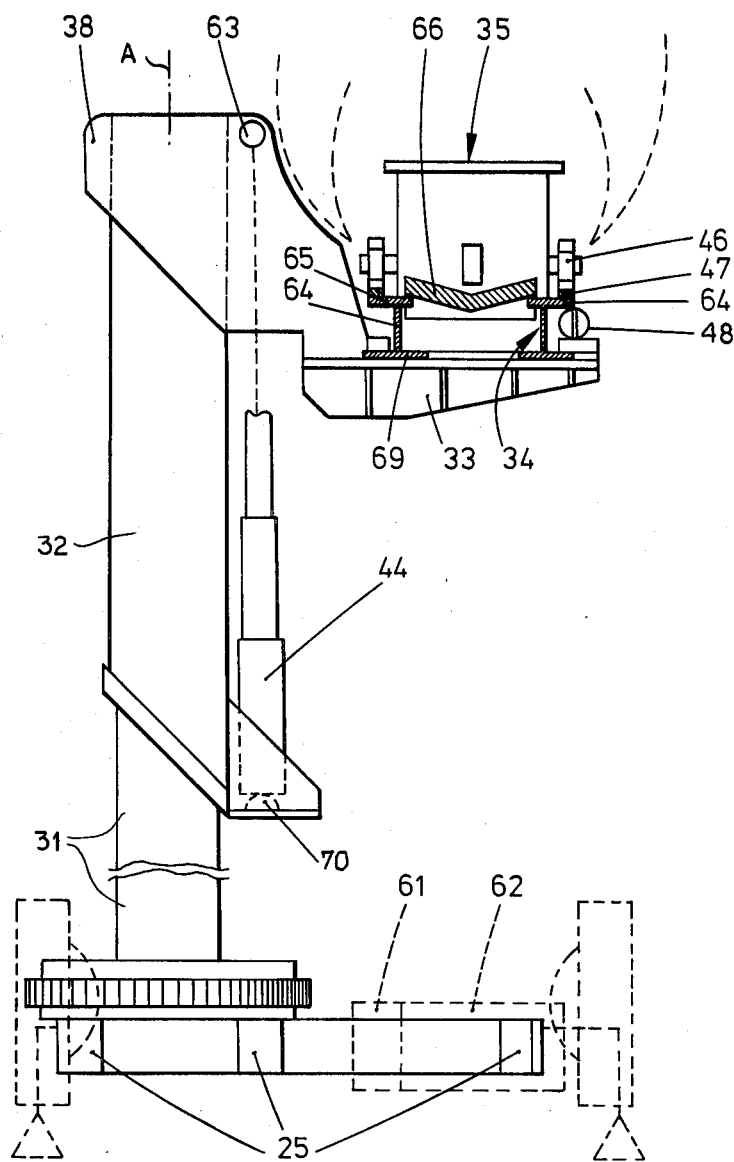

Each of the props 36 as shown in FIGS. 2 and 4 has a pair of rollers 56 and 57 rotatable on shafts 55 about axes parallel to the longitudinal direction of the support 34. These shafts 55 extend between the ends of links 53 and 54 pivoted at 51 and 52 on the respective slide 67. The one link 54 is simple, but the other has two arms, the second one of which is connected to the piston rod 50a of a cylinder 50 fixed on the slide 67 also. Thus as this cylinder 50 expands it raises the two rollers 56 and 57 to cradle and support the tube bundle 21.

The apparatus described above functions as follows.

The base 20 is maneuvered into position adjacent the heat exchanger 22 whose core is to be pulled, and the motor 41 is operated to align the support 34 parallel to and underneath this heat exchanger 22. The feet 27 are then dropped to stabilize the apparatus on the ground, with the wheels 26 lifted free. The base 25 can be in any angular orientation relative to the support 34, since the center of mass of the support 34 will always lie over it.

The cylinders 43 and 44 are then pressurized to lift the support 34 up until it is a few centimeters below the mouth of the exchanger 22, but normally spaced horizontally about 50 cm away from it. The cylinder 48 is then expanded somewhat to bring the front end of the support 34 directly against the exchanger 34 as shown in FIG. 2 and the clip 37 is secured to further stabilize the entire assembly.

Meanwhile the carriage 35 is moved right up to the far front end by its motor 45 so that, as shown in FIG. 2, it partially underlies the end flange 24 of the bundle 22. The cylinders 43 and 44 are again expanded slightly so that the core 22 is lifted somewhat and approximately half its weight is carried by the support 34.

The motor 45 is then operated to draw the core 23 out of the exchanger 23 at a speed of about 6 m/minute, that is very slowly. The props 36 are meanwhile expanded as they come into properly spaced position under the core 23 to ensure that it is held and moved gently, these props 36 sliding easily with the core 23 as same is pulled back. Normally this is done when at most 80% of the core 23 is withdrawn.

The core 23 is pulled out until its center of mass is roughly over the center of the vehicular base 25. Then the clip 37 is released and the cylinder 48 actuated to pull the front end of the support 34 with the core 23 about 50 cm away from the mouth of the exchanger 22. The motor 41 is then operated to bring the support 34 parallel to the base 25, if necessary, and the cylinders 43 and 44 relax to drop the entire elevated assembly down onto this base 25.

The entire vehicle is then lowered back down onto its wheels 26 and driven off at 6 km/hr-10 km/hr to the cleaning location. At this location the support 34 can be pivoted through 90° to align the core end with an appropriate fitting of a cleaning apparatus. Thus the core 23 does not have to be taken off the machine according to this invention, but can be serviced right on it.

Once appropriate servicing is finished the steps outlined above are repeated in reverse order to return the core to its exchanger.

The system according to the instant invention is therefore relatively simple, yet at the same time is capable of doing a job normally done by several bulkier pieces of equipment. One operator can manage the equipment entirely. Providing the column 30 to one side of the support 34 makes it possible to greatly reduce the overall height of the assembly, so that it can be used even in relatively cramped quarters. In addition the entire assembly can be as long as or even somewhat shorter than the longest core to be handled, so that maneuvering the core is not made more difficult by its being on a bulky apparatus. Since the core is gently supported troque-free by the props 36, and is pulled straight out and pushed straight into the exchanger 22, it is not likely to be damaged.

I claim:

1. In combination with a heat exchanger having a horizontally elongated and longitudinally removable tube bundle, an apparatus comprising:
   an elongated vehicular base provided with wheels and capable of rolling on the ground in a predetermined direction longitudinal of said base;
   an upright vertically telescoping column supported on said base and defining an upright axis;
   an elongated support to one side of the upper end of said column and defining a horizontal axis;
   means for rotating said support about said upright axis, whereby said horizontal axis can be parallel or transverse to said elongated base;
   a carriage displaceable axially along said support and adapted to engage the end of said bundle; and
   means for displacing said carriage axially along said support when engaged with said bundle to displace said bundle along said support.

2. The apparatus defined in claim 1 wherein said column has upper, lower, and intermediate vertically telescoping parts, said apparatus further comprising means for vertically relatively telescoping said parts.

3. The apparatus defined in claim 2 wherein said elongated support is fixed on said upper part to one side thereof and can move into a lower position virtually resting on said vehicular base.

4. The apparatus defined in claim 3 wherein said means for rotating said support includes a turntable on said base carrying said lower part for rotation through 360° about said upright axis.

5. The apparatus defined in claim 1 wherein said means for displacing said carriage on said elongated support includes a hydraulic motor on said carriage having a pinion and at least one rack on said support meshing with said pinion.

6. The apparatus defined in claim 1, further comprising on said support at least one vertically expansible prop displaceable axially along said support.

7. The apparatus defined in claim 1 wherein said support is axially slidable on said column and is provided with at least one hydraulic cylinder connected between said support and said column, whereby said cylinder can expand and contract to axially displace said support on said column.

8. The apparatus defined in claim 1 wherein said vehicular base is provided with an engine and a pump driven thereby, said means for displacing including a hydraulic motor powered by said pump.

9. The apparatus defined in claim 1 wherein said support has a front end provided with a clip engageable with said heat exchanger to fix said support relative to said heat exchanger.

10. The apparatus defined in claim 1 wherein said support includes a pair of axially extending and horizontally spaced I-beams having upper flanges on which said carriage is displaceable.

11. The apparatus defined in claim 10 wherein said means for displacing said carriage includes a hydraulic motor on said carriage having a pinion and at least one rack on one of said upper flanges and meshing with said pinion.

12. The apparatus defined in claim 1 wherein said tube bundle has at one end a flange, said carriage being formed with a seat complementary to said flange.

13. The apparatus defined in claim 1, further comprising on said support at least one vertically expansible prop provided with a rollers riding on said support and displaceable axially along said support.

14. The apparatus defined in claim 1 wherein said support has a back end provided with a lifting tool.

* * * * *